United States Patent
Theil et al.

(10) Patent No.: US 6,599,387 B1
(45) Date of Patent: *Jul. 29, 2003

(54) METHOD FOR THE THERMAL ADHESION OF PARTS MADE OF ACRYLIC PLASTIC AND PARTS MADE OF ENGINEERING PLASTICS

(75) Inventors: Alexander Theil, Reinheim (DE); Karl-Heinz Fehring, Stockstadt/Rh. (DE); Friedel Emmerich, Seeheim-Jugenheim (DE)

(73) Assignee: Roehm GmbH & Co. KG, Darmstadt (DE)

( * ) Notice: Subject to any disclaimer, the term of this patent is extended or adjusted under 35 U.S.C. 154(b) by 0 days.

This patent is subject to a terminal disclaimer.

(21) Appl. No.: 08/552,572
(22) Filed: Nov. 3, 1995

(30) Foreign Application Priority Data

Nov. 4, 1994 (DE) .......................... 44 39 420

(51) Int. Cl.[7] .................. B32B 31/00; B32B 31/20
(52) U.S. Cl. ................. 156/309.9; 156/308.2; 156/308.4; 156/324; 156/322
(58) Field of Search ................. 156/308.2, 309.9, 156/324, 308.4, 322

(56) References Cited

U.S. PATENT DOCUMENTS

| | | | |
|---|---|---|---|
| 3,150,031 A | * 9/1964 | Powell | 156/209 |
| 3,163,104 A | * 12/1964 | Lapham | 156/309.9 |
| 3,810,815 A | * 5/1974 | Welhart et al. | 156/308.4 |
| 4,021,287 A | 5/1977 | Martin | |
| 4,838,974 A | 6/1989 | Nied et al. | |
| 5,069,851 A | 12/1991 | Hicks et al. | |
| 5,380,388 A | * 1/1995 | Montagne et al. | 156/309.9 |
| 5,837,091 A | * 11/1998 | Theil et al. | 156/308.2 |

FOREIGN PATENT DOCUMENTS

| | | |
|---|---|---|
| DE | 2058585 | 7/1971 |
| FR | 1473254 | 3/1967 |

* cited by examiner

Primary Examiner—Jeff H. Aftergut
(74) Attorney, Agent, or Firm—Oblon, Spivak, McClelland, Maier & Neustadt, P.C.

(57) ABSTRACT

The invention concerns a method for the production of a flat composite (5) from plastic parts by means of a thermal adhesion of two plastic parts (1,1'), heated on one side of their surfaces (1a,1a'), consisting of plastics A and B, wherein the surfaces (1a,1a') are heated on the adhesion side to surface temperatures of 10 to 100° K. above the Vicat softening points VET (according to DIN ISO 306) of the pertinent plastics A and B, provided that the plastic parts (1,1') retain their original shape during the preheating phase, and are pressed between a pair of rolls (2,3), at an advance rate between 5 and 200 mm/sec and with a pressing force between 10 and 500 N acting on the roll (3); preferably, the plastics (1,1') exhibit engraving or embossing (6,6'), with which composite (5) can be produced with a three-dimensional inclusion (7) of a defined shape; furthermore, a flat or elongated object (8) is embedded between the plastic parts (1,1') to be adhered during the adhesion of the composite (5).

18 Claims, 2 Drawing Sheets

METHOD FOR THE THERMAL ADHESION OF PARTS MADE OF ACRYLIC PLASTIC AND PARTS MADE OF ENGINEERING PLASTICS

BACKGROUND OF THE INVENTION

1. Field of the Invention

The invention concerns a method for the thermal adhesion of parts made of acrylic plastic with parts made of engineering plastics or of parts made of acrylic plastics or engineering plastics with one another, and a composite produced by means of this method.

2. Description of the Prior Art

Processes are known in the art for the production of composites from parts made of acrylic plastic, particularly made of poly(methyl methacrylate), with parts made of engineering plastics, such as polycarbonate, polyester, polyether, polyamide, polyketone, polysulfone, or blends thereof. In addition, processes are known for the production of a composite from parts made of an engineering plastic with another engineering plastic.

Thus, such composites can be produced, for example, with the aid of an adhesive, wherein the selection of an adhesive must be dependent on the chemical structure of the pertinent plastics (regarding adhesives, see, for example, *Kirk-Othmer Encyclopedia of Chemical Technology*, 3rd. Ed., Vol. 1, pp. 488–510, J. Wiley, New York, 1978). Generally, variations of adhesive methods include adhesion with the aid of a solvent, with an adhesive lacquer, or with a polymerizable adhesive. A process involving a solvent or an adhesive lacquer is feasible, particularly a halogenated solvent, because of their favorable dissolution properties with various plastics. However, halogenated hydrocarbon solvents present undesirable health and environmentally relevant risks. Furthermore, when adhesives are used to adhere plastic parts cracks may form, particularly involving the adhesion of injection molded or extruded parts, which generally exhibit characteristic stresses.

The polymerizable adhesives for the adhesion of plastic parts generally contain a monomer component of the individual plastic, certain fractions of the polymer, synthesized from such monomer components and, to enhance the acceleration of the adhesion process, a polymerization initiator, such as a peroxide, photoinitiator, or redox initiator. Also, according to this method, stress cracking can appear in a plastic part, caused by a monomeric component which acts as a solvent. The curing time with a polymerizable adhesive generally is between 1 and 3 hours, which is also a disadvantage for certain applications, particularly in (continuous) manufacturing.

Furthermore, a composite of plastics can be produced by heat sealing, which takes place at temperatures above the softening point of the pertinent plastic and generally with the application of pressure (see in this regard, for example, Vieweg-Esser, *Plastics Handbook*, Vol. IX, "Polymethacrylates," Carl Hanser, Munich, 1975).

In the described methods for heat sealing, local overheating at the sealing site, which leads to the decomposition of the plastic and thus to the generation of gaseous monomeric components, must be carefully avoided. Therefore, flat composites made of plastics have been produced in the past predominantly by adhesion.

Another possibility for the production of a flat plastic composite is heat sealing in the presence of an intermediate layer, which adheres well under heating on both sides of plastic parts to be joined. Thus, for example, in European Patent No. A 584,593, plastic composites are described in which a composite is produced from two poly(methyl methacrylate) plastic layers by heat sealing in the presence of an intermediate layer with a thickness between 0.01 mm and several millimeters and where the intermediate layer is made of a polymer essentially synthesized from methyl methacrylate. Preferably, the intermediate layer is a thin film or plate made of poly(methyl methacrylate). In this method also, occlusions of air or monomeric decomposition products occasionally occur in the composite if the prescribed temperature control is not maintained.

Perhaps the most common method for the production of flat plastic composites made of different composites is extrusion. The technique of the coextrusion of various plastics which are melted in separate extruders and brought together in a common coextrusion nozzle to form a multilayer plastic composite is, in itself, known. European Patent No. 65,619 (U.S. Pat. No. A 4,477,521) describes plastic composites consisting of core layers synthesized from polycarbonate, polystyrene, poly(vinyl chloride), polyethylene, or styrene-butadiene mixed polymers and of cover layers synthesized from homo- or mixed polymers of methyl methacrylate. An important prerequisite for the coextrusion method is that all layers must be made of thermoplastic, extrudable plastics As shown in European Patent No. A 65,619, the thickness of the individual layers of the plastic composite must be permanently controlled and readjusted under strong standard deviations. This represents another expensive process step, in addition to the already inherently, complex coextrusion technology.

SUMMARY OF THE INVENTION

It is, therefore, an object of the present invention to satisfy the long-existing need of a technically simple method for the production of a flat plastic composite in which a joining seam is as invisible as possible and the joining can be achieved without an auxiliary, such as adhesive or film, and the joining surface is attainable without visible inhomogeneities, such as streaks or occlusions of gas.

This object and other objects as will be better understood from the following description have been surprisingly achieved by the discovery that optically satisfactory composites of at least two plastic parts can be attained as by:

a method for the production of a flat composite from at least two plastic parts, a first plastic part and a second plastic part, each having a first and a second surface, wherein said first surface is an adhesion surface and wherein said first plastic part is polymer A and said second plastic part is polymer B, comprising the steps of:

(a) preheating said adhesion surfaces of said first and second plastic parts to a temperature of 10 to 100° K. above the Vicat softening point of said polymer A and polymer B, with the proviso that said plastic parts retain their original shape during said preheating step;

(b) pressing said first and second plastic parts between a first and a second rolls, said rolls been provided with means for exerting pressing force, so that said preheated adhesion surface of said first plastic part contacts with said preheated adhesion surface of said second plastic part; and (c) advancing said first and second plastic parts between said rolls at an advance rate of 5 to 200 mm/sec while exerting a pressing force of 10 to 500 N.

DESCRIPTION OF PREFERRED EMBODIMENTS

Figure 1:
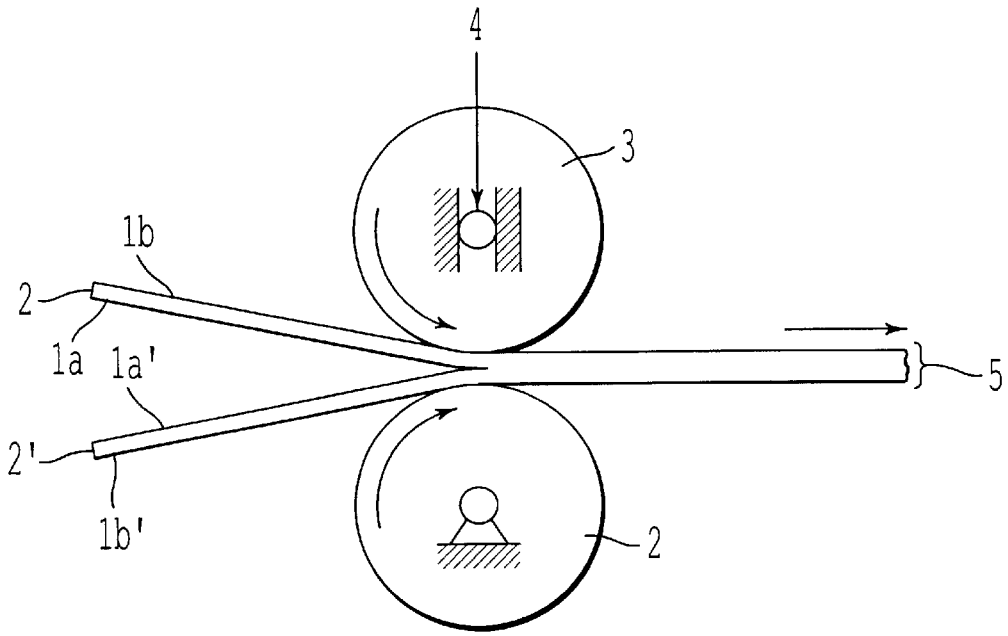
FIG. 1 is a schematic representation of the method of thermal adhesion of plastic parts. 1 and 1' are the plastic parts, having an adhesion surface (1a and 1a') and a second surface (1b & 1b'), advancing between the two rolls (2 & 3) of which roll 3 is supported so that it can exert pressure along the axis 4, adhering the two parts 1 and 1' to form composite (5)

The preferred embodiments will now be described by reference to FIGS. 1–3.

The plastic parts (FIGS. 1, 1 and 1') are preheated on the surfaces (1a, 1a'), that are intended for adhesion or the joining at temperatures of 10 to 100° K., preferably 20 to 75° K., above the Vicat softening points VET (according to DIN ISO 306) of the plastics A and B which are used to produce the plastic parts (1,1'), provided that the plastic parts (1,1') themselves remain dimensionally stable and between a pair of rolls (2,3), in which at least one roll (3), over which the pressing force can be exerted, and which is supported in a movable manner, is pressed with a pressing force (4) between 10 and 500 N and with a continuous advance, wherein the advance rate is between 5 and 200 mm/sec. Preferably, plastic A is a polymer of methyl methacrylate, and plastic B, a polymer selected from the group consisting of polycarbonate, polyester, polyether, polyamide, and their blends.

In another preferred embodiment of the invention, plastic A, which is used to produce plastic part (1), and plastic B, which is used to produce plastic part (1'), are identical.

The plastic parts (1,1') are preferably plates or films with thicknesses between 0.5 and 100 mm, particularly preferred with thicknesses between 1 and 50 mm.

In another preferred embodiment of the invention, a flat object (FIG. 2, 8), such as a picture or color film, or an elongated object (8), such as thread, wire, steel spiral, or a thin web of another plastic different from A and B, is embedded between the adhesion areas (1a,1a') of the plastic parts (1,1'). A condition for this is that the thickness of such an object be a maximum of 50%, preferably a maximum of 25%, of the thickness of the plastic parts (1,1').

Also preferred are plastic parts (1,1'), preferably plates, which exhibit engravings or embossing (FIG. 2; 6) of at least 0.2 mm, preferably of at least 1 mm depth and which are pressed in such a way that the embossing (6) points to the adhesion areas (1a,1a'). In this way, it is possible to produce a composite (5) with three-dimensional inclusions (7) of a defined shape.

The surface temperature necessary for adhesion at the adhesion sites (1a, 1a') of the plastic parts (1,1') can be produced with indirect physical methods, such as high frequency or ultrasound field, or preferably by direct irradiation, for example, with a warp air blower or an infrared radiation source. Generally, the difference between surface and core temperatures of the plastic parts (1,1') is between 20 and 150° K., preferably between 30 and 120° K., wherein the core temperatures of the plastic parts always remain at least 10° K. below the softening points VET of the plastics A and B.

Plastic A, which is used to produce plastic part (1), is preferably a polymer of methyl methacrylate, which can be synthesized with up to 50 wt % other monomers which are copolymerizable with methyl methacrylate. It is particularly preferred, that the fraction of the methyl methacrylate is 80 to 100 wt %. Suitable comonomers which can be used include copolymerizable monomers such as alkyl acrylate or methacrylate with 1 to 6 carbon atoms in the alkyl ester radical, acrylo- and/or methacrylonitrile, styrene, and/or substituted styrene and maleic anhydride. Generally used are thermoplastically or thermoelastically shapeable polymethacrylate plastics of the above composition with specific viscosities according to DIN 51562 in chloroform at 25° C. in the range between 290 and 1,500 mL/g, corresponding to weight average molecular weights $M_W$ between $3 \times 10^4$ and approximately $5 \times 10^6$ daltons.

Moreover, in another preferred embodiment of the invention, plastic A, which is used to produce plastic part (1), can be identical with plastic B, mentioned below and which is used to produce plastic part (1'), and thus can be selected also from the group consisting of polycarbonate, polyester, polyether, polyamide, polyketone, polysulfone, or blends thereof.

It is preferred that plastic B, which is used to produce plastic part (1'), belongs to the category of "engineering plastics" and is selected from the group consisting polycarbonate, polyester, polyether, polyamide, polyketone, polysulfone, and blends thereof.

A polyester suitable for use in the present invention is generally a thermoplastic polyalkylene terephthalate, such as polyethylene terephthalate or polybutylene terephthalate, with weight average molecular weights between $5 \times 10^3$ and $2 \times 10^5$ daltons (with regard to polyesters, see, for example, Kirk-Othmer Encyclopedia of Chemical Technology, 3rd. Ed., Vol. 18, pp. 549–574, J. Wiley, New York, 1982).

As a polyamide for plastic B, generally an amorphous polyamide of the nylon type is suitable, such as copolyamide or polyamide with branched alkylene groups in the polymer chain (with regard to polyamides, see, for example, Kirk-Othmer, loc. cit., Vol. 18, pp. 328–371).

Furthermore, plastic B can be selected from the group of amorphous or aromatic polyether, which include polyketone and polysulfone. As examples for aromatic polyether, one can mention the following: polyphenylene oxide, polyether sulfone, polyether ketone, polyether imide (with regard to aromatic polyethers, see, for example, Kirk-Othmer, loc. cit., Vol. 18, pp. 594–615).

Preferred as plastic B is polycarbonate, such as tetramethylbisphenol A polycarbonate, copolycarbonate of bisphenol A and terephthalic acid units and, in particular, bisphenol A polycarbonate (with regard to polycarbonates, see, for example, Kirk-Othmer, loc. cit., Vol. 18, pp. 479–494).

It is also preferred that plastic B and plastic A, used to produce plastic parts (1) and (1') are identical polymers of methyl methacrylate or bisphenol A polycarbonate.

Plastics (polymers) A and B can contain, in fractions of $10^{-3}$ to 20 wt %, based on A or on B, additives known in the art, such as a light protection agent, a stabilizer against thermal decomposition, a lubricant, filler, and in particular, a dye or pigment.

Plastic parts (1) and (1') are preferably in the form of a plate or a film, which provides for a large-area of adhesion, for which the method in accordance wish the invention is particularly suitable. The plates or films preferably exhibit thicknesses between 0.5 and 100 mm, particularly preferred between 1 and 50 mm. The area of the plates can be, for example, between 0.01 and 5 m$^2$, with plate widths between 0.1 and 2 m and plate lengths between 0.1 and 5 m. Accordingly, in the embodiment where plastic parts (1) and (1') are films, a composite of practically any length and with widths of, for example, 0.1 to 2 m can be produced.

Figure 2:
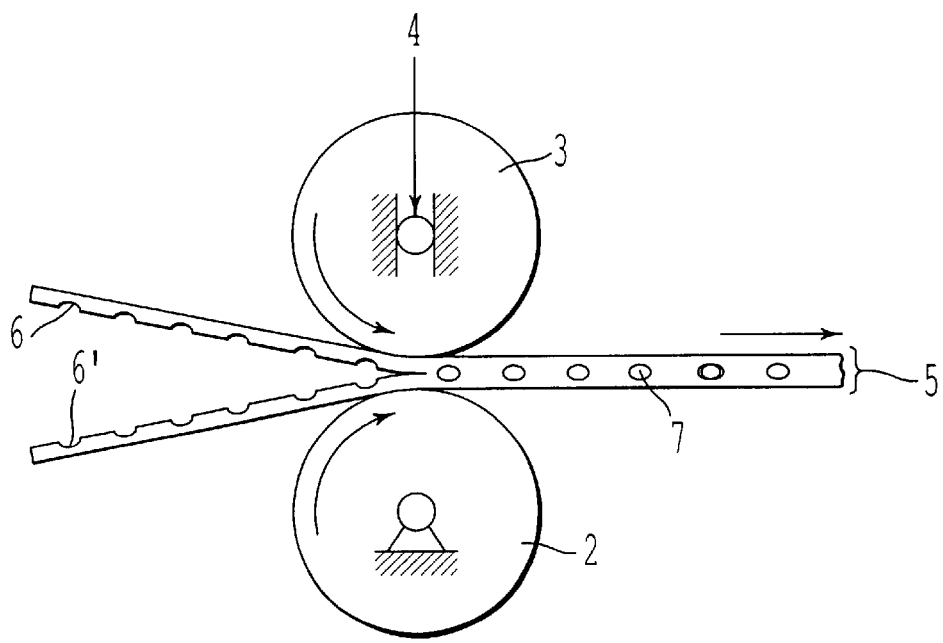
FIG. 2 represents schematically engraving or embossing, where the embossing (6 & 6') on the adhesion surface produces composite (5) with inclusions (7).

FIG. 1 shows the apparatus, in accordance with the invention, for the production of composites made of plastic parts (1) and (1'), by way of example in a diagrammatic sketch. The plastic parts (1) and (1'), heated on the surface of the adhesion sides (1a) and (1a') to temperatures between 10 and 100° K., preferably between 20 and 75° K. above the Vicat softening points VET (measured according to DIN ISO 306) of the pertinent plastics A and B, are directed through a pair of rolls rotating in an opposite direction wherein the lower roll (2) is firmly supported and wherein the upper roll (3), which is supported in a moveable manner, can be acted upon with a pressing force (4) of 10 to 500 N. The advanced rate at which the plastic parts (1) and (1') are pressed, is, for example, determined by the rotational speed of the rolls (2) and (3) and is between 5 and 200 mm/s, preferably between 10 and 150 mm/sec. The rolls (2) and (3), which are made, for example, of stainless steel are generally polished on the surfaces or provided with an elastic surface coating, for example, a soft rubber layer with a low Shore hardness (see, in this regard, European Patent No. A 201,044), in order not to produce any damage on the surface sides (1b) and (1b') of the plastic parts (1) and (1') and later the composite (5). In special cases, the surfaces of the rolls (2) and (3) can be structured, wherein, to this end, the surfaces (1b) and (1b') of the plastic parts (1) and (1') are preferably heated to of temperatures between 10 and 30° K. above the Vicat softening points VET of the pertinent plastics A and B.

The surface of the adhesion sides (1a) and (1a') of the plastic parts (1) and (1') are heated in such a way that the plastic parts themselves remain dimensionally stable. For the heating of the adhesion sides (1a) and (1a'), indirect physical methods such as high-frequency electromagnetic fields or ultrasonic fields can be used. Preferably, direct methods for the heat irradiation are used, such as a warm air blower or infrared irradiator. In general, plastic parts (1) and (1') are preheated in an oven to avoid thermal stresses before the heat irradiation in such a way that the difference between surface and core temperatures of the plastic parts (1,1') is between 20 and 150° K., preferably between 30 and 120° K., wherein the core temperatures of the plastic parts always remain at least 10° K. below the softening points VET of plastics A and B.

The pressing force (4), exerted with the upper roll (3) on plastic parts (1,1') and the composite (5) of plastic parts (1,1'), can be produced, for example, with simple lever apparatuses or hydraulically. Generally, the pressing force (4) is constant during the entire pressing process, wherein pressing forces between 10 and 500 N, preferably between 25 and 400 n, are used.

In another specific embodiment of the invention, composite (5) is made up of plastic parts (1,1') with flat rims, such as domes, barrel arches, or bowls, by heating the rims selectively and joining them together according to the method of the invention.

Plastic parts (1,1'), particularly plates or films, can have an engraving or embossing (FIG. 2; 6,6'), which exhibit depth of at least 0.2 mm, preferably of at least 1 mm, and which is found either on the external side (1b,1b') or preferably on the adhesion side (1a,1a') of the plastic parts (1,1'). If the engraving or embossing is on the adhesion side (1a,1a'), then a three-dimensional inclusion (7) of a defined shape can be produced in the composite (5) (FIG. 2). Preferably, such three-dimensional inclusions (7) are produced by the adhesion of two plates (1,1'), in which each plate exhibits an engraving or embossing (6,6') on the adhesion sides (1a,1a'), which are joined together as mirror images. The condition for the production of such a three-dimensional inclusion (7) is that the engraving or embossing (6,6') remains dimensionally stable when the surfaces of the adhesion sides (1a,1a') are heated at the aforementioned adhesion temperatures.

In another embodiment of the invention, a flat or elongated object (FIG. 3, 8) can be embedded between the adhesion sides (1a,1a') of the plastic parts (1,1'). The prerequisite for the optically satisfactory embedding of such object, that is, for example, avoiding occlusions of air or the formation of streaks, is that the thickness of the object (8) is a maximum of 50%, preferably a maximum of 25% of the thickness of the plastic parts (1,1'). Flat objects (8) that can be embedded between the adhesion sides (1a,1a') of the plastic parts (1,1') include, for example, a photograph, a print, a color film, a pigment paper, or a film made up of thermoplastic elastomer, wherein with the latter, safety glass composites can be produced. With the method in accordance with the invention, one should note that the embedded object (8) may take up to a maximum of 90% of the area of the adhesion sides (1a,1a'). Elongated objects (8) which can be embedded between the plastic parts (1,1'), include, for example, a narrow plastic sheet, which can be dyed, a wire, steel spiral, a material strip, a paper strip, or preferably a thread, quite especially a plastic thread with high elasticity and high modulus, such as polyester or nylon thread, whose embedding leads to a particularly impact-resistant composite.

The method in accordance with the invention makes possible a large adhesion area of plastic parts (1,1') made up of different or identical plastics A and B, in particular of plates and films without the simultaneous production of occlusions of gas, which can be formed by enclosed air or monomeric components, such as thermal decomposition products of plastics A and B, with very simple means. In viewing composite (5) formed in such a manner, it is not possible to recognize an adhesion seam or other optical inhomogeneity visually.

By the adhesion of plastic parts (1,1') with engravings or embossing (6,6') on the adhesion sides (1a,1a'), three-dimensional inclusions (7) of a defined shape can be produced in the composite (5) (FIG. 2), which leads to an extremely plastic effect of such composite system (5). Thus, for example, figures can be represented as inclusions (7), by embossing the mirror-image semi-formats into the plastic parts (1,1') and by joining together in a form-fitting manner with the method in accordance with the invention.

Figure 3:
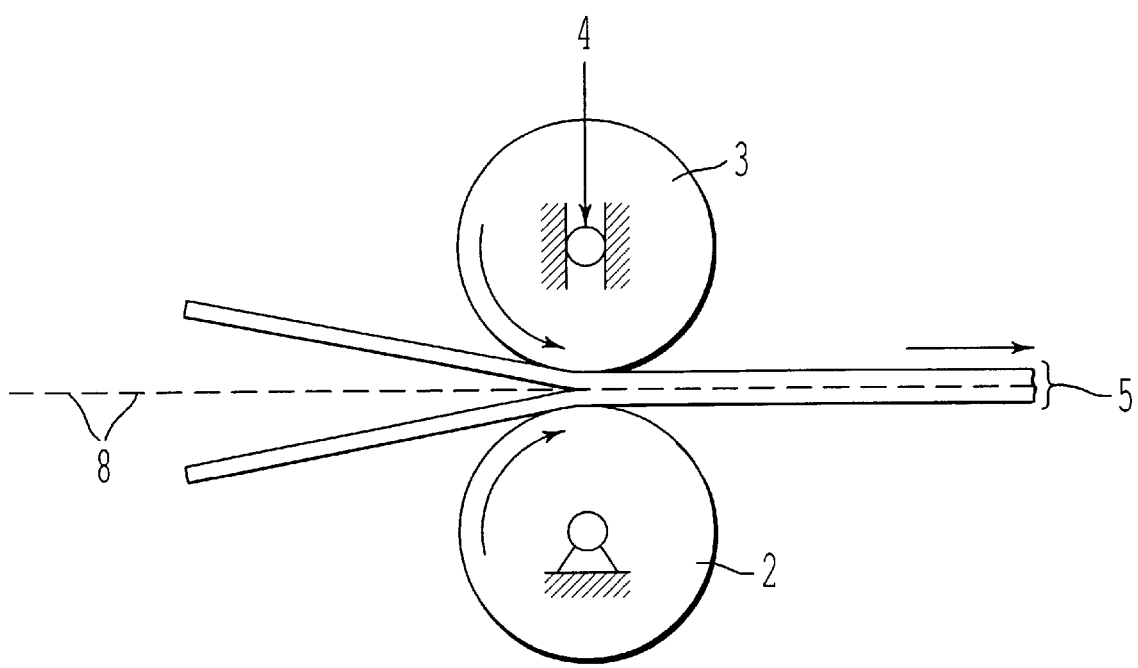
FIG. 3 is a schematic representation of an embodiment of the process where flat or elongated objects (8) are embedded in the composite (5).

Furthermore, a flat or elongated object (8), such as a picture, film, thread, wire, or steel spiral, can be embedded between the adhesion sides (1a,1a') of the plastic parts (1,1') into the composite (5) in such a way that the plastics A and B completely enclose the objects (8) (FIG. 3). Such composite systems can be used advantageously, for example, in the advertising field (illuminated display, large area advertisement), as composite systems (with films made of thermoplastic elastomers) or as shatterproof, soundproof walls (with embedded threads made of elastic plastics with a high modulus).

Having generally described this invention, a further understanding can be obtained by reference to certain specific examples which are provided herein for the purposes of illustration only and are not intended to be limiting unless otherwise specified.

EXAMPLES

Example 1

Production of a Composite From Poly(methyl Methacrylate) Plates With Embedded Paper Picture 2 plates made of polymethyl methacrylate (Plexiglas® XT 20070: molecular weight $M_W$, approximately 155,000 daltons) with the dimensions 530×360×8 mm (length×width×height) are each heated to a temperature of 175° C. on one surface (adhesion side), placed before the rolls with opposite adhesion sides still separated, and together with the paper picture between the adhesion sides, drawn in between the rolls at an advance rate of 50 mm/sec, wherein the rolls are pressed together with a force of 100 N.

The result is a composite with embedded, undamaged paper picture without occlusions of gas, in which no adhesion seams are visible when inspected.

Example 2

Production of a Composite From Polymethyl Methacrylate Plates With Three-dimensional Inclusions Several molds are embossed on 2 plates made of polymethyl methacrylate (Plexiglas® XT 20070: molecular weight $M_W$, approximately 155,000 daltons) with the dimensions 275×165×8 mm (length×width×height), on one surface (adhesion side), according to current methods of the state of the art, wherein the embossing depth is between 0.2 and 10 mm, and the embossing molds can be brought together in a form-fitting manner when the adhesion sides are placed on one another. Subsequently, the plates are heated on their adhesion side to a surface temperature of 175° C., placed before the rolls with opposite, still separated adhesion sides, and drawn in between the rolls at an advance rate of 50 mm/sec, wherein the rolls are pressed together with a force of 100 N.

The result is a composite with embedded three-dimensional inclusions without occlusions of gas, in which no adhesion seams are visible when inspected.

Example 3

Preparation of a Composite From a Plate Made of Polymethyl Methacrylate (A) and a Plate of Bisphenol A Polycarbonate (B)

A plate made of polymethyl methacrylate (A) (Plexiglas® XT 20070: molecular weight M., approximately 155,000 daltons) and a plate made of polycarbonate (B) (Makrolon® 283: molecular weight $M_W$ approximately 30,000 daltons) with the dimensions 340×390×8 mm (width×length×height) are heated on their adhesion side to a surface temperature of 175° C. for plate A and 195° C. for plate B, placed before the rolls with opposite, still separated adhesion sides, and drawn in between the rolls at an advance rate of 50 mm/sec, wherein the rolls are pressed together with a force of 100 N.

The result is a composite of A and B without occlusions of gas, in which no adhesion seams can be recognized when inspected.

Example 4

Production of a Composite From bisphenol A Polycarbonate Plates

Two plates made of polycarbonate (Makrolon® 283: molecular weight $M_W$, 30,000 daltons) with the dimensions 390×340×8 mm (length×width×height) are heated, on their adhesion side to a surface temperature of 195° C., placed before the rolls with opposite, still separate adhesion sides, and drawn in between the rolls at an advance rate of 50 mm/sec, wherein the rolls are pressed together with a force of 100 N.

The result is a composite without occlusions of gas, in which no adhesion seams can be recognized when inspected.

What is claimed as new and is desired to be secured by Letters Patent of the United States is:

1. A method for the production of a flat composite from at least two plastic parts, a first plastic part and a second plastic part, each having a first and a second surface, wherein said first surfaces are adhesion surfaces and wherein said first plastic part is polymer A and said second plastic part is polymer B, comprising the steps of:

(a) preheating said adhesion surfaces of said first and second plastic parts to a temperature of 10 to 100° K. above the Vicat softening point of said polymer A and polymer B, with the proviso that said plastic parts retain their original shape during said preheating step;

(b) pressing said first and second plastic parts between a first and a second rolls without the positioning of an auxiliary adhesion or film material between the first and second plastic parts, said rolls having been provided with means for exerting a pressing force so that said preheating adhesion surface of said first plastic part contacts with said preheated adhesion surface of said second plastic part; and (c) advancing said first and second plastic parts between said rolls at an advance rate of 5 to 200 mm/sec while exerting a pressing force of 10 to 500 N.

2. The method according to claim 1, wherein said polymer A is a polymer of methyl methacrylate and said polymer B is selected from the group consisting of polycarbonate, polyester, polyether, polyamide, and a mixture of polymers thereof.

3. The method according to claim 1, wherein said polymer A and said polymer B are identical and are selected from the group consisting of polyalkylmethacrylate, polycarbonate, polyether, polyamide and a mixture of polymers thereof.

4. The method according to claim 1, wherein said first and second plastic parts are each a plate or a film with thicknesses between 0.5 and 100 mm.

5. The method according to claim 4, wherein the thickness of said plate or film is between 1 and 50 mm.

6. The method according to claim 1, wherein a flat or elongated object with a maximum thickness of 50% of the thickness of said plastic parts, is used between said plastic parts to be adhered, wherein said flat or elongated object may cover a maximum of 90% of said adhesion surface of said plastic part.

7. The method according to claim 6, wherein said flat or elongated object has a maximum thickness of 25% of the thickness of said plastic parts.

8. The method according to claim 1, wherein said plastic parts exhibit engraving or embossing of at least 0.2 mm depth, and wherein said plastic parts are pressed in such a manner that a composite is formed with three-dimensional inclusions of a defined shape.

9. The method according to claim 8, wherein said engraving or embossing is at least 1 mm in depth.

10. The method according to claim 1, wherein the difference between a surface temperature of said adhesion surface and a core temperature of said plastic part is at least 30° K.

11. The method according to claim 1, wherein the difference between a surface temperature of said adhesion surface and a core temperature of said plastic part is at least 20° K.

12. The method according to claim 1 wherein, said core temperature of the plastic part is at least 10° K. below the Vicat softening point, VET, of said polymer A and said polymer B.

13. The method according to claim 4, wherein said plate or film exhibits a width between 0.1 and 2 m and, at least in the case of the plates, a length between 0.1 and 5 m.

14. The method according to claim 6, wherein a film made of a thermoplastic elastomer is embedded as flat object between said plastic parts to be adhered.

15. The method according to claim 6, wherein a wire, a steel spiral, or thread, is embedded as elongated object between said plastic parts to be adhered.

16. The method according to claim 15, wherein said thread is a plastic thread having a high elasticity and high modulus.

17. A method for the production of a flat composite from at least two plastic parts, a first plastic part and a second plastic part, each having a first and a second surface, wherein said first surfaces are adhesion surfaces and wherein said first plastic part is formed of polymethylmethacrylate and said second plastic part is formed of a polymer selected from the group consisting of polycarbonate, polyester, polyether, polyamide and mixtures thereof, comprising the steps of:

(a) preheating said adhesion surface of said polymethylmethacrylate and second plastic parts to a temperature of 10 to 100° K. above the Vicat softening point of said polymethylmethacrylate and said second plastic part, with the proviso that said plastic parts retain their original shape during said preheating step;

(b) pressing said first and second plastic parts between a first and a second rolls without the positioning of an auxiliary adhesion or film material between the first and second plastic parts, said rolls having been provided with means for exerting a pressing force so that said preheating adhesion surface of said first plastic part contacts with said preheated adhesion surface of said second plastic part; and (c) advancing said first and second plastic parts between said rolls at an advance rate of 5 to 200 mm/sec while exerting a pressing force of 10 to 500 N.

18. A method for the production of a flat composite from at least two plastic parts, a first plastic part of polymer A and a second plastic part of polymer B, each having a first and a second surface, wherein said first surfaces are adhesion surfaces and wherein polymer A and polymer B are identical and are selected from the group consisting of polyalkylmethacrylate, polycarbonate, polyether, polyamide and mixtures thereof, comprising the steps of:

(a) preheating said adhesion surfaces of said first and second plastic parts to a temperature of 10 to 100° K. above the Vicat softening point of said polymer A and polymer B, with the proviso that said plastic parts retain their original shape during said preheating step;

(b) pressing said first and second plastic parts between first and second rolls without the positioning of an auxiliary material between the first and second plastic parts, said rolls having been provided with means for exerting a pressing force so that said preheated adhesion surface of said first plastic part contacts with said preheated surface of said second plastic part; and (c) advancing said first and second plastic parts between said rolls at an advance rate of 5 to 200 mm/sec while exerting a pressing force of 5 to 500 N.

* * * * *